R. H. PLASS & H. McMANUS.
GAS GOVERNOR.
No. 193,548.                             Patented July 24, 1877.
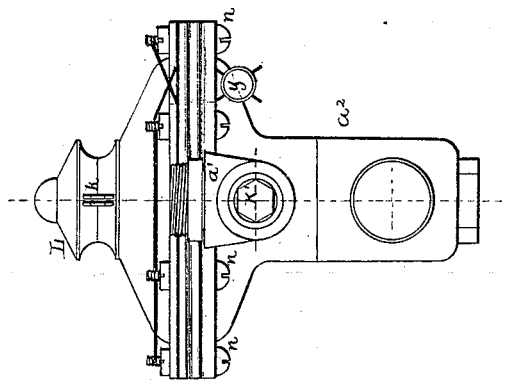
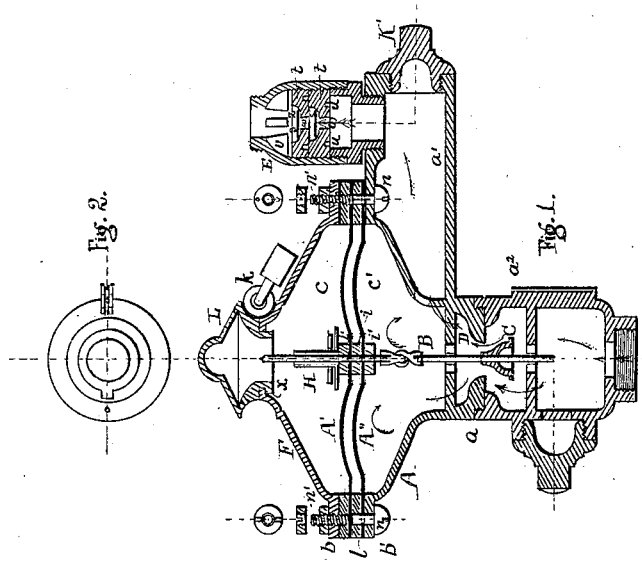
WITNESSES.
G. A. Shepardson
T. E. Flynn
Inventors:
R. H. Plass
H. McManus
By their attorney
Charles E. Foster

UNITED STATES PATENT OFFICE.

REUBEN H. PLASS AND HENRY McMANUS, OF NEW YORK, N. Y.; SAID McMANUS ASSIGNOR TO SAID PLASS.

IMPROVEMENT IN GAS-GOVERNORS.

Specification forming part of Letters Patent No. 193,548, dated July 24, 1877; application filed November 15, 1876.

*To all whom it may concern:*

Be it known that we, REUBEN H. PLASS and HENRY McMANUS, of the city, county, and State of New York, have invented a Gas-Governor, of which the following is the specification:

The object of our invention is a gas-regulating governor, constructed, as fully described hereinafter, to facilitate adjustment and attachment to the pipes, prevent unauthorized persons from tampering with the working parts, to avoid loss by the leaking of the diaphragm, and to secure a proper regulation at various pressures.

In the accompanying drawing, Figure 1 is a sectional elevation of our improved regulator; Fig. 2, a plan view of part of the regulator; Fig. 3, an external view.

A is the main body of the casing of the regulator, having a tubular extension, $a$, projecting downward, a lateral tubular extension, $a^1$, and expanded at the top, to which is applied the expanded cover F, which, with the body, incloses the main chamber $c\ c'$. This chamber is divided by two horizontal flexible diaphragms, $A'\ A''$, separated at the edges by a ring, $l$, which, with the edges of the diaphragms, is clamped between the flanges $b\ b'$ of the top and body, and secured by screw-bolts $n$.

The valve-spindle B extends through both diaphragms, a washer, $i$, in the spindle, being interposed between them, and nuts $i'\ i'$ clamping the diaphragms upon the washer, and securing a tight joint round the spindle.

The valve C is adapted to a seat in a partition, D, and the extension or branch $a$ is divided below said partition, the lower section $a^2$ (which contains the inlet-openings) being detachable to permit access to the valve.

To an opening, $x$, in the top of the cover is adapted a plug or cap, L, secured by a bayonet-joint fastening, and provided with a perforated lug, $k$, which, when the plug is in place, coincides with a similar lug on the cover, so that the cap may be secured by a lock-bolt or sealed wire passed through the lugs, thus preventing unauthorized access to the rings H, by which the diaphragms are weighted.

The bolts $n$ have perforations $n'$ at the ends for the passage of a wire or cord, the ends of which are brought together and secured by a seal $y$, thus preventing unauthorized access to the interior of the regulator. The branch $a^1$ has two outlets, one at the end or side and one at the top or bottom, at right angles to each other, a plug, K', being adapted to either, so as to permit connection to either vertical or horizontal delivery-pipes. The diaphragms are of leather, (coated with oxidized linseed-oil and plumbago,) of paper, vulcanized fiber, or other material, which we do not here claim, and effectually prevent the danger which arises from the accidental perforation of a single diaphragm, as a leak in one will not interfere with the effectual operation of the other, which, being of the same diameter, will operate in the same manner.

In order to prevent the too rapid passage of gas through a large regulator when but few burners are in use, and the larger apparatus may not operate with sufficient delicacy, we employ a disk or disks, $s$, adapted to perforated partitions $t$ in the discharge or conducting pipe.

In the present instance a case, E, communicating with the discharge branch, is used, and the partitions $t$ are formed by disks with threaded edges, adapted to the threaded interior of the case, from which they may be withdrawn by an instrument fitting openings $u$. In each partition is a central recess, $z$, with a dished bottom and central opening, $w$, and in this recess is the disk or valve $s$, composed of mica or other non-corrosive material.

An upward current of illuminating or other gas or vapor through the openings $w$ will strike the under side of the valve $s$, which, rising to a limited extent, will permit the gas to pass laterally beneath and into the delivery-pipe, but, owing to the superior atmospheric pressure, will tend to regain its seat, and will approach the latter in proportion as the force of the upward current increases.

It is this fact that renders the device available for use as a gas-governor, the space between the valve and its seat being contracted automatically to reduce the volume of gas passing through the same in proportion to the pressure or force of the upward current.

We have discovered that, by regulating the relative proportions of the opening or passage $w$ and the valve $s$, the device may be adjusted to permit any desired maximum pressure, the relative proportion being about as the amount of pressure, in tenths, is to one hundred. Thus, if the governor is to be set at five-tenths maximum-pressure, the area of the passage $w$ must be one-twentieth of the area of the disk-valve, as five is one-twentieth of one hundred.

In order to prevent the displacement of the valve by sudden puffs of gas, which would throw it upward, the radiating vanes $v$, extending from the sides of the chamber E, are used. Should the valve, under any circumstance, be forced away from its seat beyond its normal position, it would be arrested by the vanes, while ample space around its edge is afforded for gas to pass above the same, insuring its return to its proper position.

The vanes $v$ may be formed by longitudinal radial ribs left in boring out the chamber, as shown, or they may be otherwise formed.

To prevent any tendency of the valve to fly from its seat by sudden and extreme changes of pressure, two valves may be used, as shown, each limited in its upward movement, and serving to counteract any variable action of the other.

It will be seen that the construction adopted permits ready access to the valves, and that the latter may be arranged at any point in the delivery-pipe.

We claim—

1. The combination, in a gas-regulator, of the two diaphragms, washer or ring $l$, and the body A and detachable cover F, as set forth.

2. The combination of the two diaphragms, valve-rod, washer, $i$, and nuts $i'$ $i'$, as specified.

3. The combination of the body A, cover F, fastening devices, and cord or wire, and seal $y$, as and for the purpose set forth.

4. The combination of the delivery-pipe, perforated partition or disk $t$, disk-valve $s$, and ribs $v$, for the purpose set forth.

5. The auxiliary disk, combined with the disk $s$, perforated partition, and ribs $v$, as and for the purpose set forth.

6. The disk or partition $t$, having the central opening, and the recesses $u$ $u$, threaded at the edge, and adapted to and adjustable in the threaded interior of the delivery-pipe, as specified.

In testimony whereof we have signed our names to this specification in the presence of two subscribing witnesses.

R. H. PLASS.
    HENRY McMANUS.

Witnesses:
 CHAS. W. PLASS,
 J. C. JAMES.